(12) United States Patent
Yarbrough et al.

(10) Patent No.: US 10,077,758 B2
(45) Date of Patent: Sep. 18, 2018

(54) CORRUGATED PRE-CURED LAMINATE PLATES FOR USE WITHIN WIND TURBINE ROTOR BLADES

(71) Applicant: General Electric Company, Schenectady, NY (US)

(72) Inventors: Aaron A. Yarbrough, Clemson, SC (US); Christopher Daniel Caruso, Greenville, SC (US); Donald Joseph Kasperski, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 584 days.

(21) Appl. No.: 14/754,768

(22) Filed: Jun. 30, 2015

(65) Prior Publication Data

US 2017/0002792 A1   Jan. 5, 2017

(51) Int. Cl.
*F03D 1/06* (2006.01)

(52) U.S. Cl.
CPC .... *F03D 1/0675* (2013.01); *F05B 2280/6003* (2013.01); *Y02E 10/721* (2013.01)

(58) Field of Classification Search
CPC .......... F03D 1/0675; F03D 80/00; F03D 9/25; F05B 2220/30; F05B 2220/20; F05B 2240/2211; F05B 2280/6005; Y02P 70/523; Y02E 10/74; Y02E 10/721; Y02E 10/722; B29L 2031/085; B29B 11/16; B29D 99/0028; B29C 70/023; B29C 70/083
See application file for complete search history.

(56) References Cited

U.S. PATENT DOCUMENTS

| 5,104,718 | A  | * | 4/1992  | Asada ................ B29C 37/0064 |
|           |    |   |         | 156/196                            |
| 6,264,877 | B1 |   | 7/2001  | Pallu De La Barriere               |
| 7,473,385 | B2 |   | 1/2009  | Stiesdal et al.                    |
| 7,625,185 | B2 |   | 12/2009 | Wobben                             |
| 8,079,818 | B2 |   | 12/2011 | Burchardt et al.                   |
| 8,142,162 | B2 |   | 3/2012  | Godsk et al.                       |
| 8,168,027 | B2 |   | 5/2012  | Jacobsen et al.                    |
| 8,172,538 | B2 |   | 5/2012  | Hancock et al.                     |

(Continued)

FOREIGN PATENT DOCUMENTS

| CA | 2526407     | 11/2012 |
| CN | 201155423 Y | 11/2008 |

(Continued)

*Primary Examiner* — Logan Kraft
*Assistant Examiner* — Joshua R Beebe
(74) *Attorney, Agent, or Firm* — Dority & Manning, P.A.

(57) ABSTRACT

A pre-cured laminate plate for use within a component of a wind turbine rotor blade may generally include a plate body extending in a thickness direction between a first side and a second side and in a widthwise direction between a first end and a second end. The plate body may define a plate thickness between the first and second sides. The pre-cured laminate plate may also include a plurality of channels formed in the plate body between the first and second ends. Each channel may extend in the thickness direction between a top end that is open along the first side of the plate body and a bottom end that terminates at a location between the first and second sides of the plate body such that the plate body defines a reduced thickness between the bottom end of each channel and the second side of the plate body.

20 Claims, 6 Drawing Sheets

(56) References Cited

U.S. PATENT DOCUMENTS

| | | |
|---|---|---|
| 8,297,932 B2 | 10/2012 | Arocena De La Rua et al. |
| 8,317,479 B2 | 11/2012 | Vronsky et al. |
| 8,348,622 B2 | 1/2013 | Bech |
| 8,353,674 B2 | 1/2013 | Bech |
| 8,506,258 B2 | 8/2013 | Baker et al. |
| 8,511,996 B2 | 8/2013 | Llorente Gonzalez et al. |
| 8,540,491 B2* | 9/2013 | Gruhn ............... B29B 11/16 |
| | | 416/230 |
| 8,657,581 B2 | 2/2014 | Pilpel et al. |
| 8,673,106 B1 | 3/2014 | Jolley et al. |
| 8,747,098 B1 | 6/2014 | Johnson et al. |
| 8,826,534 B2 | 9/2014 | Cappelli et al. |
| 8,961,142 B2 | 2/2015 | Wansink |
| 8,992,813 B2 | 3/2015 | Robbins et al. |
| 2007/0040294 A1* | 2/2007 | Arelt ................. B29C 70/525 |
| | | 264/136 |
| 2009/0148300 A1 | 6/2009 | Driver et al. |
| 2010/0314028 A1* | 12/2010 | Hedges ............ B29C 70/083 |
| | | 156/93 |
| 2011/0045276 A1 | 2/2011 | Grove-Nielsen |
| 2011/0318186 A1 | 12/2011 | Kristensen et al. |
| 2012/0027609 A1* | 2/2012 | Ogde ................. B29C 70/86 |
| | | 416/226 |
| 2012/0039720 A1 | 2/2012 | Bech |
| 2012/0141291 A1* | 6/2012 | Appleton ............ B32B 5/245 |
| | | 416/241 R |
| 2012/0180582 A1 | 7/2012 | Piasecki |
| 2012/0230830 A1 | 9/2012 | Lind et al. |
| 2013/0022466 A1 | 1/2013 | Laurberg |
| 2013/0108453 A1 | 5/2013 | Baker et al. |
| 2013/0129518 A1 | 5/2013 | Hayden et al. |
| 2013/0149166 A1 | 6/2013 | Schibsbye |
| 2013/0164133 A1 | 6/2013 | Grove-Nielsen |
| 2013/0195661 A1 | 8/2013 | Lind et al. |
| 2013/0237356 A1 | 9/2013 | Pasch |
| 2013/0294925 A1* | 11/2013 | Appleton ............ B29C 70/086 |
| | | 416/241 R |
| 2013/0333823 A1* | 12/2013 | Hedges ............ B29C 70/083 |
| | | 156/93 |
| 2014/0003955 A1* | 1/2014 | Richter ............. B29C 70/547 |
| | | 416/230 |
| 2014/0003956 A1 | 1/2014 | Lull et al. |
| 2014/0023513 A1 | 1/2014 | Johnson et al. |
| 2014/0030094 A1 | 1/2014 | Dahl et al. |
| 2014/0119936 A1 | 5/2014 | Dahl et al. |
| 2014/0295187 A1 | 10/2014 | Jacobsen et al. |
| 2014/0301859 A1* | 10/2014 | Hancock ............ F03D 1/0675 |
| | | 416/230 |

FOREIGN PATENT DOCUMENTS

| | | |
|---|---|---|
| CN | 100476200 C | 4/2009 |
| CN | 101725481 A | 6/2010 |
| CN | 101906251 A | 12/2010 |
| CN | 101302302 B | 2/2011 |
| CN | 101194102 B | 4/2012 |
| CN | 102459881 A | 5/2012 |
| CN | 102705157 A | 10/2012 |
| DE | 102011051172 A1 | 12/2012 |
| DE | 102012219224 B3 | 3/2014 |
| DK | 201270816 A | 1/2014 |
| DK | 201270818 A | 1/2014 |
| EP | 2113373 B1 | 1/2011 |
| EP | 2255957 B1 | 7/2013 |
| EP | 2679804 A1 | 1/2014 |
| EP | 2679806 A1 | 1/2014 |
| EP | 2682256 A1 | 1/2014 |
| GB | 2451192 A | 1/2009 |
| GB | 2455044 A | 6/2009 |
| JP | 2007092716 A | 4/2007 |
| JP | 3930200 B2 | 6/2007 |
| JP | 2011032987 A | 2/2011 |
| JP | 2011038518 A | 2/2011 |
| JP | 5439412 B2 | 3/2014 |
| WO | WO 03/082551 A1 | 10/2003 |
| WO | WO 2010/025830 A2 | 3/2010 |
| WO | WO 2010/057502 A3 | 5/2010 |
| WO | WO 2011/088835 A2 | 7/2011 |
| WO | WO 2012/042261 A1 | 4/2012 |
| WO | WO 2012/140039 A2 | 10/2012 |
| WO | WO 2013/007351 A1 | 1/2013 |
| WO | WO 2013/060582 A1 | 5/2013 |
| WO | WO 2013/178228 A1 | 12/2013 |
| WO | WO 2014/044280 A1 | 3/2014 |
| WO | WO2014/049354 A1 | 4/2014 |
| WO | WO 2014/063944 A1 | 5/2014 |
| WO | WO 2015/015202 A1 | 2/2015 |
| WO | WO 2015070876 A1 * | 5/2015 ........... F03D 1/0675 |

\* cited by examiner

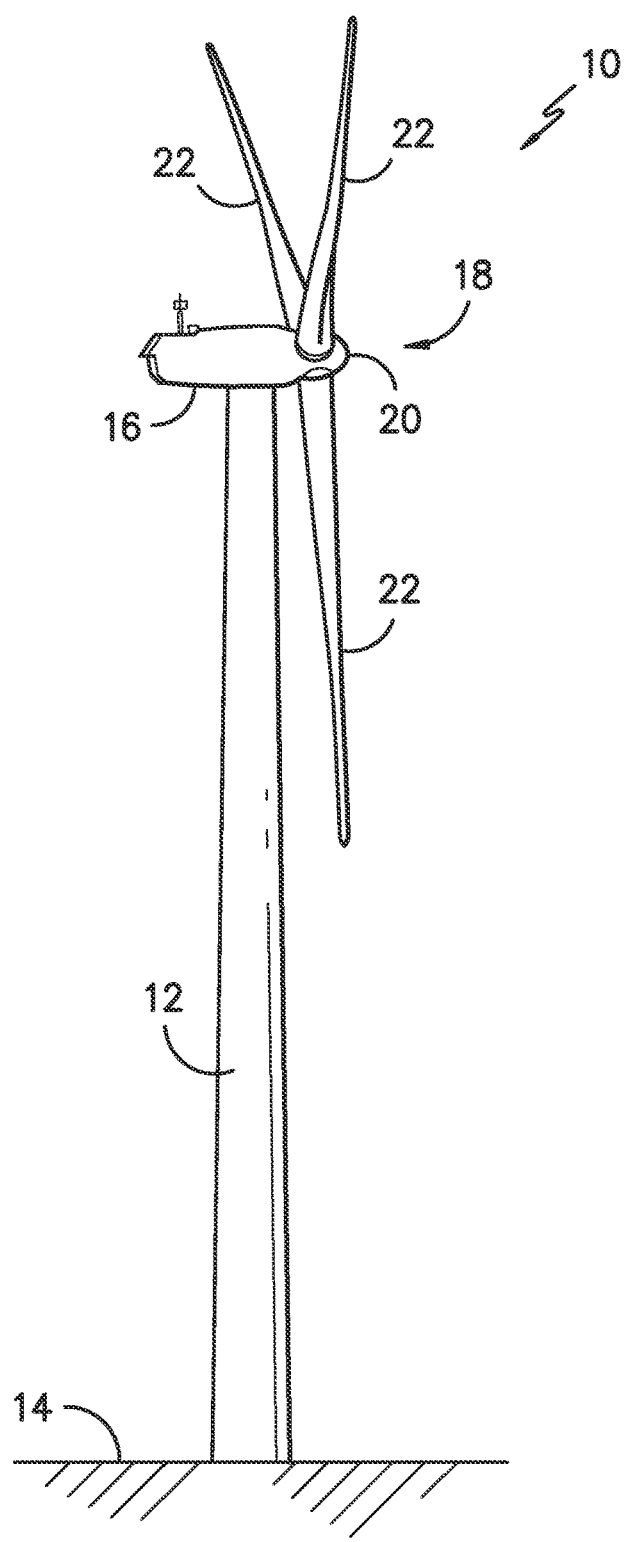
FIG. -1-

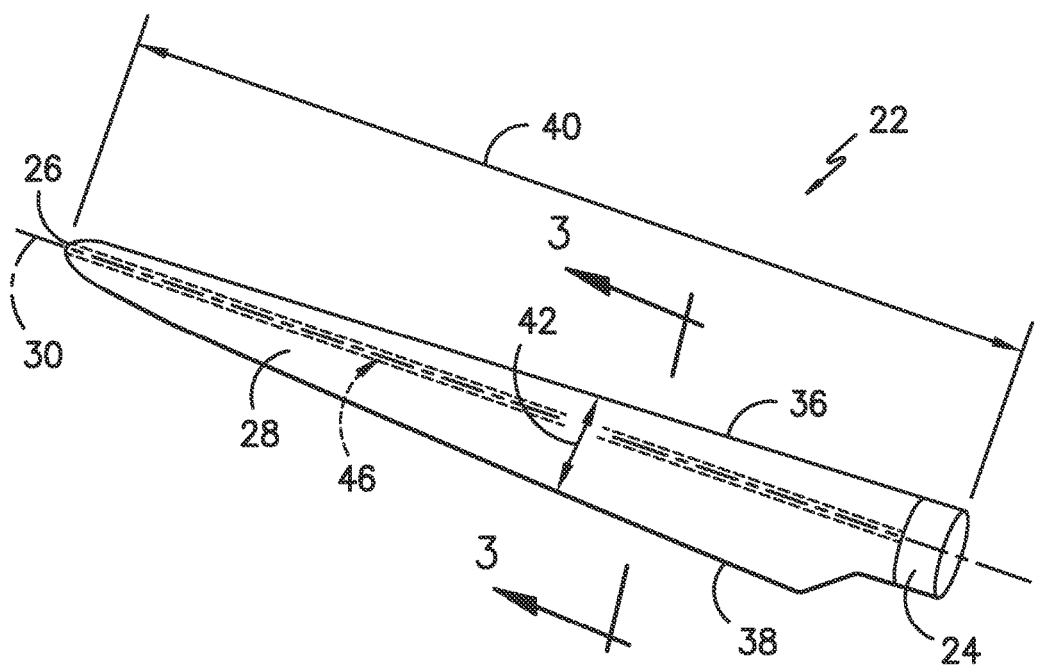
FIG. -2-
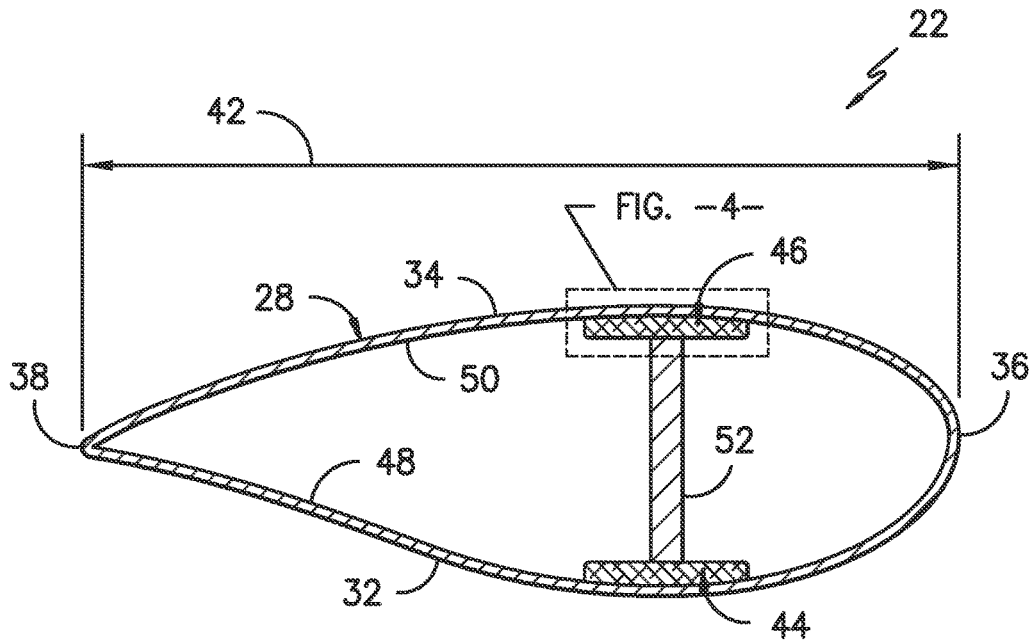
FIG. -3-

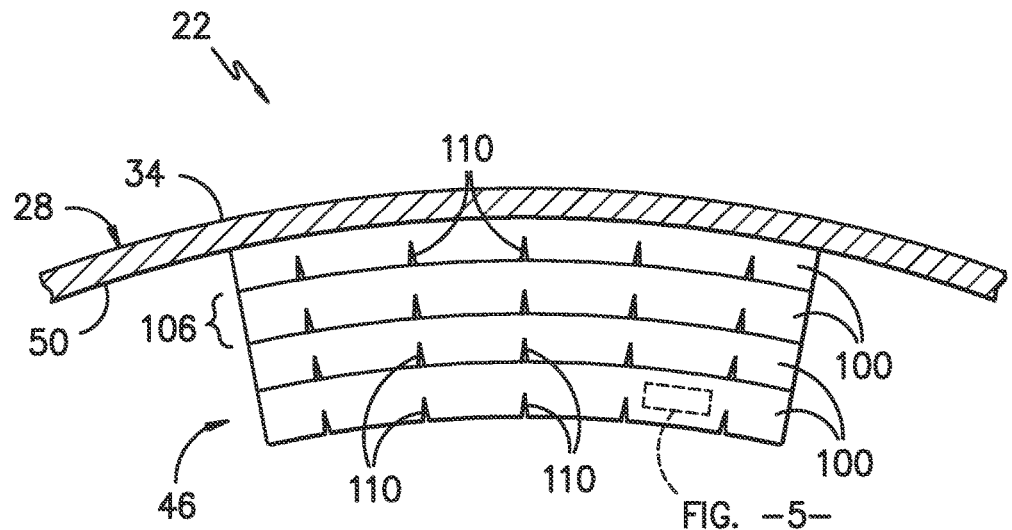
FIG. -4-
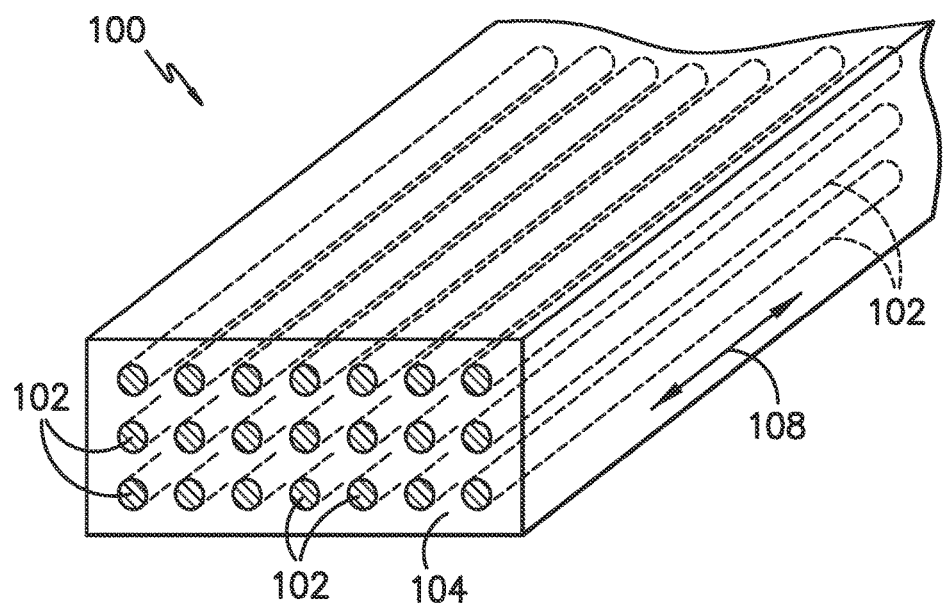
FIG. -5-

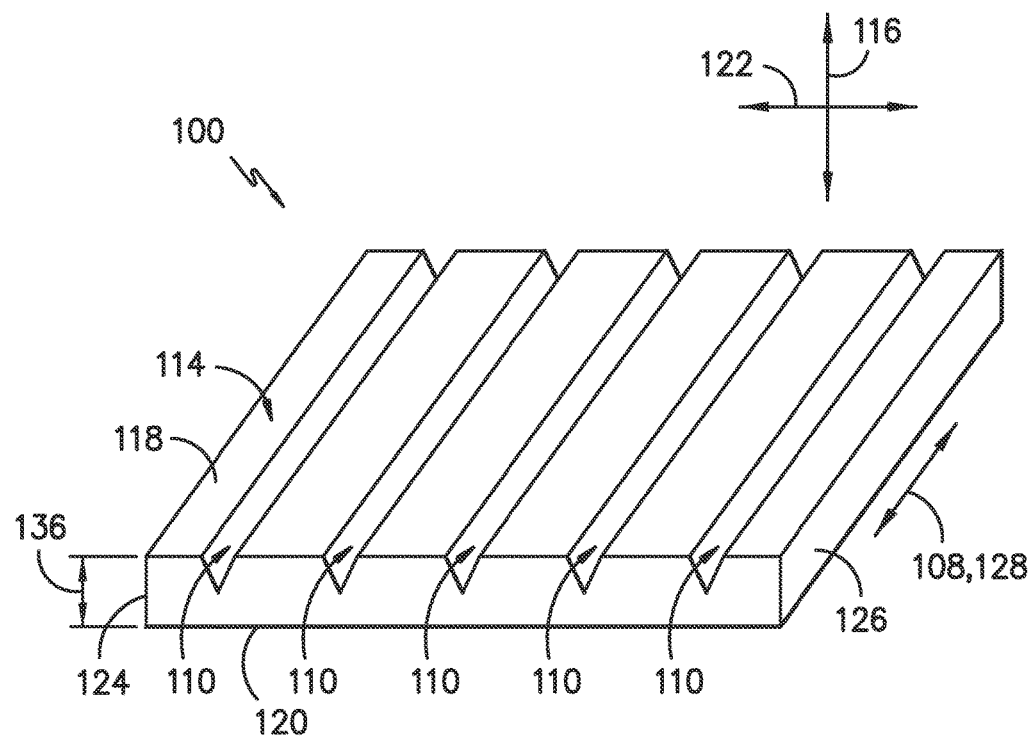
FIG. -6-
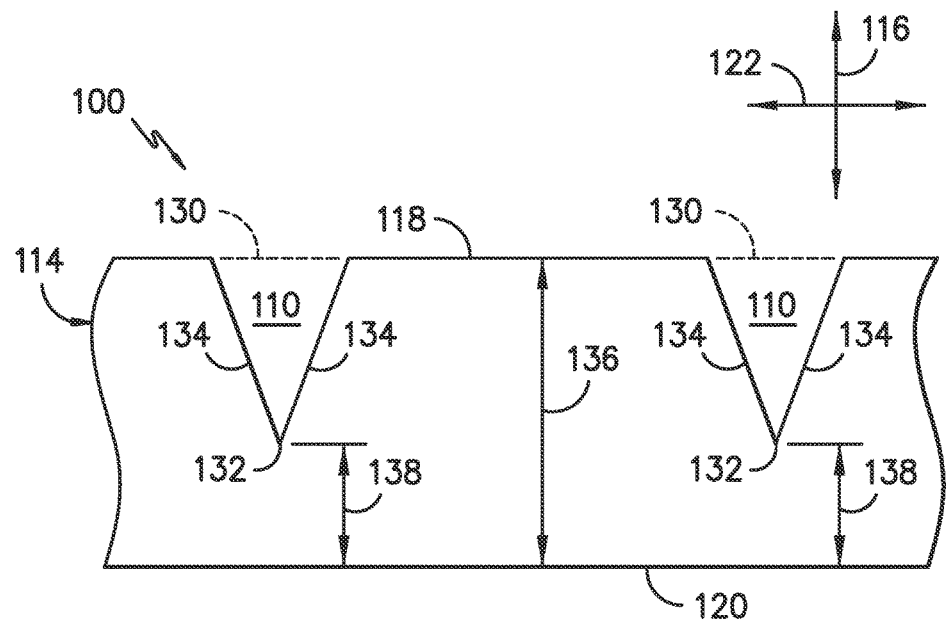
FIG. -7-

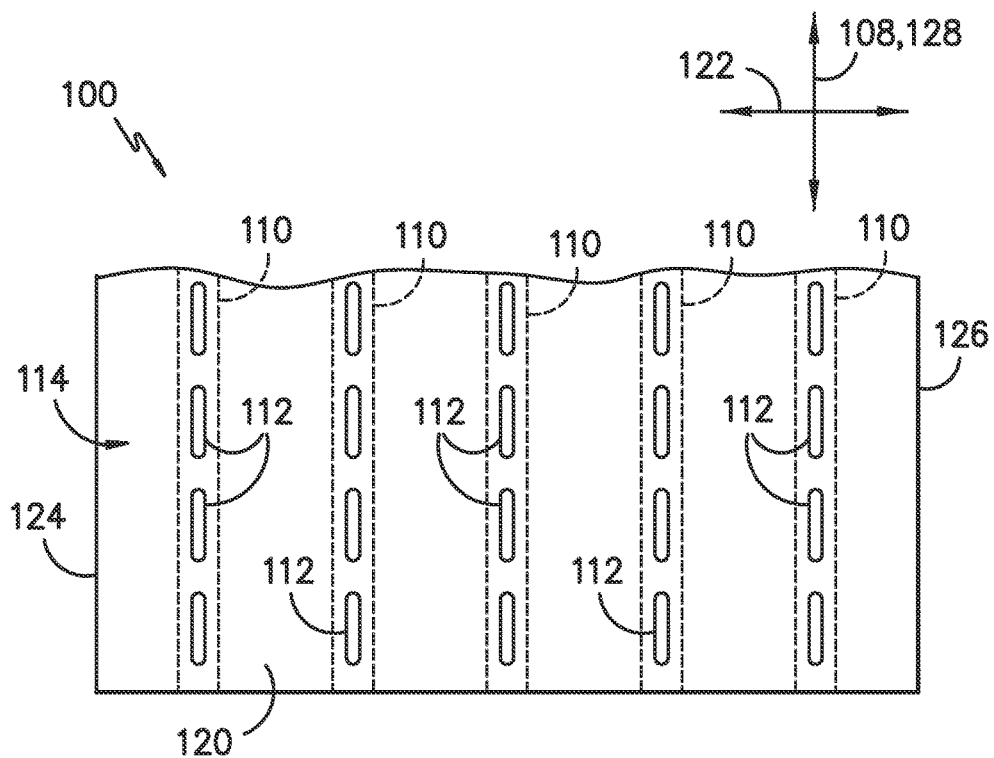
FIG. -8-
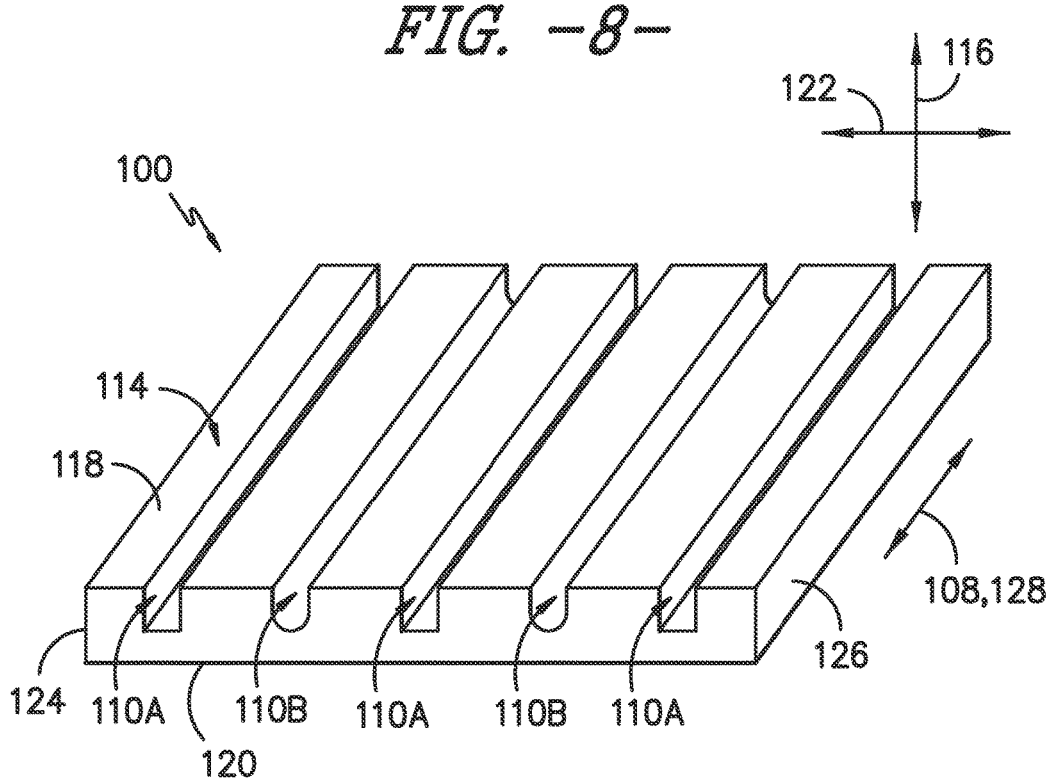
FIG. -9-

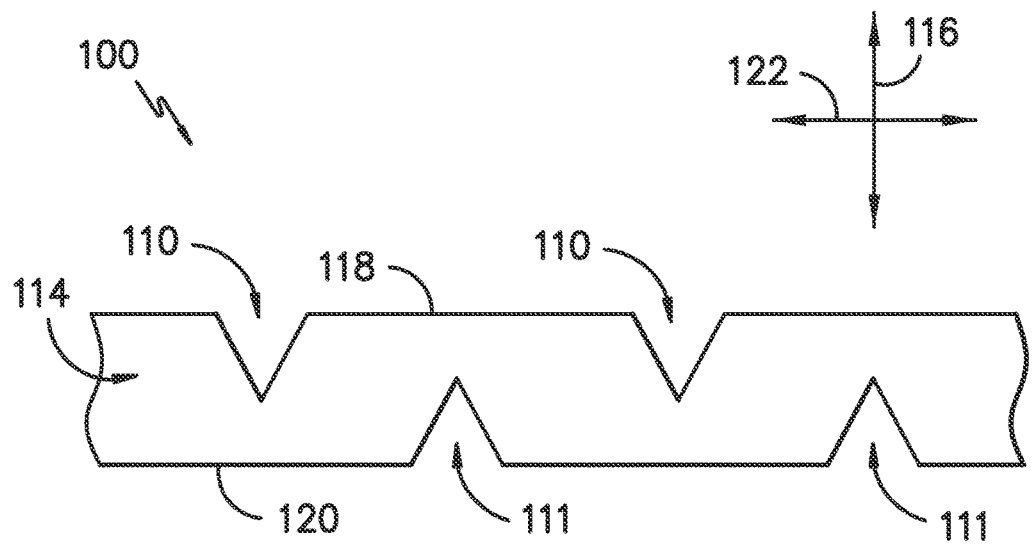
FIG. -10-
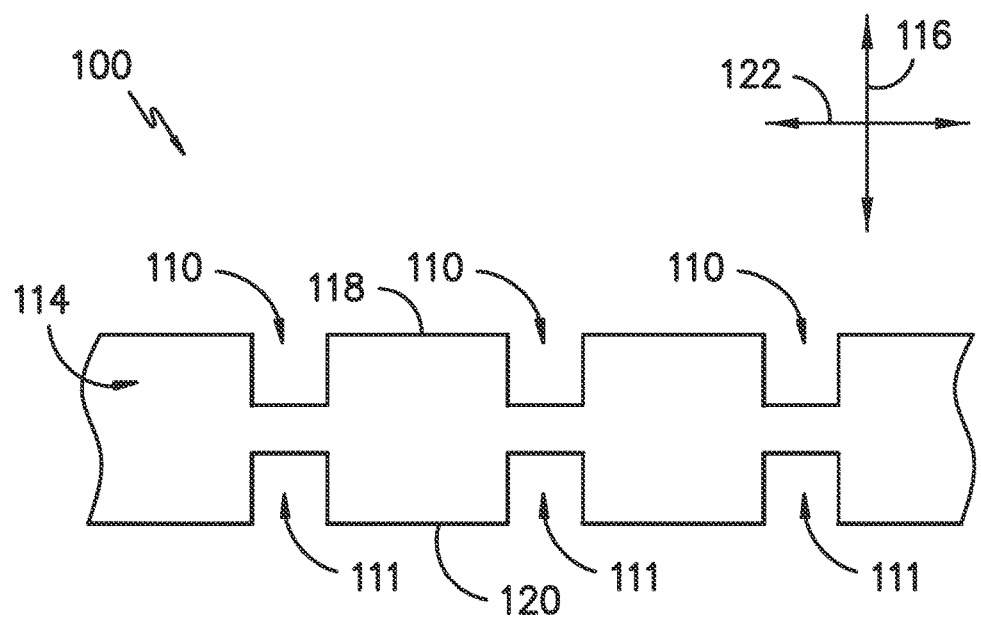
FIG. -11-

CORRUGATED PRE-CURED LAMINATE PLATES FOR USE WITHIN WIND TURBINE ROTOR BLADES

FIELD OF THE INVENTION

The present subject matter relates generally to wind turbines and, more particularly, to pre-cured laminate plates having corrugations or channels formed therein to allow the plates to conform to the chordwise curvature of a wind turbine rotor blade during the manufacturing process of the blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades typically include a body shell formed from a composite laminate material. In general, the body shell is relatively lightweight and has structural properties (e.g., stiffness, buckling resistance and strength) which are not configured to withstand the bending moments and other loads exerted on the rotor blade during operation. In addition, wind turbine blades are becoming increasingly longer in order to produce more power. As a result, the blades must be stiffer and thus heavier so as to mitigate loads on the rotor.

To increase the stiffness, buckling resistance and strength of the rotor blade, the body shell is typically reinforced using one or more structural components (e.g. opposing spar caps with a shear web configured therebetween) that engage the inner surfaces of the shell. The spar caps are typically constructed from laminate composites (e.g., glass fiber laminate composites and/or carbon fiber laminate composites) that include dry or non-cured fabric plies that are laid up within the blade mold and subsequently infused with resin. Such materials, however, can be difficult to control during the manufacturing process and/or are often defect prone and/or highly labor intensive due to handling of the non-cured fabrics and the challenges of infusing large laminated structures.

As such, recent attempts have been made to form spar caps from pre-fabricated, pre-cured laminate composites that can be produced in thicker sections, and are typically less susceptible to defects. However, the use of these thicker, pre-cured laminates also presents unique challenges during the blade manufacturing process. For example, the thicker pre-cured laminates present challenges with respect to conforming the individual laminate plies to the desired curvature of the blade due to the stiffness of such plies.

Accordingly, pre-cured laminate plates that include features to allow the plates to better conform to the desired chordwise curvature of a wind turbine rotor blade during the manufacturing process would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a component for a wind turbine rotor blade. The component may generally include an assembly of pre-cured laminate plates. Each pre-cured laminate plate may include a plate body formed from a combination of fibers and resin. The plate body may extend in a thickness direction between a first side and a second side and in a widthwise direction between a first end and a second end. The plate body may define a maximum plate thickness in the thickness direction between the first and second sides. Each pre-cured laminate plate may also include a plurality of channels formed in the plate body between the first and second ends. Each channel may extend in the thickness direction between a top end that is open along the first side of the plate body and a bottom end that terminates at a location between the first and second sides of the plate body such that the plate body defines a reduced thickness between the second side of the plate body and the bottom end of each channel.

In another aspect, the present subject matter is directed to a spar cap for a wind turbine rotor blade. The spar cap may generally include an assembly of pre-cured laminate plates. Each pre-cured laminate plate may include a plate body formed from a combination of fibers and resin. The plate body may extend in a thickness direction between a first side and a second side and in a widthwise direction between a first end and a second end. The plate body may define a maximum plate thickness in the thickness direction between the first and second sides. Each pre-cured laminate plate may also include a plurality of channels formed in the plate body between the first and second ends. Each channel may extend in the thickness direction between a top end that is open along the first side of the plate body and a bottom end that terminates at a location between the first and second sides of the plate body such that the plate body defines a reduced thickness between the second side of the plate body and the bottom end of each channel.

In a further aspect, the present subject matter is directed to a rotor blade for a wind turbine. The rotor blade may generally include a blade root, a blade tip and a body shell extending between the blade root and the blade tip. The rotor blade may also include a structural component positioned within the body shell. The structural component may be formed from at least one pre-cured laminate plate. The pre-cured laminate plate(s) may include a plate body formed from a combination of fibers and resin. The plate body may extend in a thickness direction between a first side and a second side and in a widthwise direction between a first end and a second end. The plate body may define a plate thickness in the thickness direction between the first and second sides. The pre-cured laminate plate(s) may also include a plurality of channels formed in the plate body between the first and second ends. Each channel may extend in the thickness direction between a top end that is open along the first side of the plate body and a bottom end that terminates at a location between the first and second sides of the plate body such that the plate body defines a reduced thickness between the second side of the plate body and the bottom end of each of the plurality of channels.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a wind turbine in accordance with aspects of the present subject matter;

FIG. 2 illustrates a perspective view of one embodiment of a rotor blade suitable for use within the wind turbine shown in FIG. 1 in accordance with aspects of the present subject matter;

FIG. 3 illustrates a cross-sectional view of the rotor blade shown in FIG. 2 taken about line 3-3;

FIG. 4 illustrates a close-up view of a portion of the rotor blade shown in FIG. 3, particularly illustrating a spar cap of the rotor blade formed from an assembly of pre-cured laminate plates;

FIG. 5 illustrates a perspective view of a portion of one of the pre-cured laminate plates shown in FIG. 4;

FIG. 6 illustrates a perspective view of one embodiment of a pre-cured laminate plate in accordance with aspects of the present subject matter, particularly illustrating the plate having channels formed therein;

FIG. 7 illustrates a side view of the pre-cured laminate plate shown in FIG. 6;

FIG. 8 illustrates a bottom view of the pre-cured laminate plate shown in FIG. 6, particularly illustrating openings formed in the bottom of the plate that are in fluid communication with the channels;

FIG. 9 illustrates a perspective view of another embodiment of a pre-cured laminate plate in accordance with aspects of the present subject matter, particularly illustrating the plate having channels defining differing cross-sectional shapes;

FIG. 10 illustrates a side view of a further embodiment of a pre-cured laminate plate in accordance with aspects of the present subject matter, particularly illustrating the plate having channels formed along top and bottom sides of the plate; and FIG. 11 illustrates a side view of yet another embodiment of a pre-cured laminate plate in accordance with aspects of the present subject matter, particularly illustrating the plate having aligned channels formed along top and bottom sides of the plate.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to corrugated, pre-cured laminate plates configured to use within a wind turbine rotor blade. Specifically, in several embodiments, the corrugated plates may be utilized to form one or more of the structural components of a rotor blade, such as one or more of the blade's spar caps. However, in other embodiments, the corrugated plates may be utilized to form any other suitable section, component and/or feature of a wind turbine rotor blade. For instance, the corrugated plates may be used to form all or a portion of the blade root of the rotor blade.

As will be described below, a plurality of corrugations or channels may be formed within each pre-cured laminate plate, with each channel being configured to extend lengthwise along its respective plate. For instance, in several embodiments, the channels may be configured to extend lengthwise in a direction parallel to the fiber direction of each pre-cured laminate plate. As such, when the plates are used to form the spar caps of a rotor blade, the channels may extend generally spanwise along the length of the rotor blade.

In several embodiments, the channels may be formed within each pre-cured laminate plate so as to form a region of lower thickness within the plate across the limited chordwise width of each channel. For example, in a particular embodiment, the channels may be formed within each pre-cured laminate plate such that the thickness of the plate at each channel is less than 75% of the overall thickness of the plate. By providing such lower thickness regions across the chordwise width of the plates, the plates may more easily take the shape of or conform to the desired curvature of the rotor blade, thereby enhancing the blade manufacturing process when using pre-cured laminate plates (particularly relatively thick pre-cured laminate plates).

Moreover, in several embodiments, a plurality of openings may be defined in each pre-cured laminate plate along the length of each channel. Such openings may further enhance the ability of each plate to conform to the desired chordwise curvature of the rotor blade being manufactured. In addition, the openings may also promote better through-thickness resin transfer during a subsequent infusion process.

It should be appreciated that, in several embodiments, the pre-cured laminate plates of the present subject matter may correspond to pultruded plates. As is generally understood, "pultruded composites" or "pultrusions" generally encompass reinforced materials (e.g. fibers or woven or braided strands) that are impregnated with a resin and pulled through a heated stationary die such that the resin cures or undergoes polymerization. As such, the process of manufacturing pultruded composites is typically characterized by a continuous process of composite materials that produces composite parts having a constant cross-section. However, in other embodiments, the pre-cured laminate plates described herein may be formed using any other suitable process, such as a belt-pressing manufacturing process.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIGS. 2 and 3, one embodiment of a rotor blade 22 suitable for use within the wind turbine 10 shown in FIG. 1 is illustrated in accordance with aspects of the present subject matter. Specifically, FIG. 2 illustrates a perspective view of the rotor blade 22. Additionally, FIG. 3 illustrates a cross-sectional view of the rotor blade 22 taken about line 3-3 shown in FIG. 2.

As shown, the rotor blade 22 generally includes a blade root 24 configured to be mounted or otherwise secured to the hub 20 (FIG. 1) of the wind turbine 10 and a blade tip 26 disposed opposite the blade root 24. Additionally, the rotor blade 22 may include a body shell 28 configured to extend between the blade root 24 and the blade tip 26 along a longitudinal axis 30 of the blade 22. The body shell 28 may generally serve as the outer casing/covering of the rotor blade 22 and may define a substantially aerodynamic profile, such as by defining a symmetrical or cambered airfoil-shaped cross-section. As shown in FIG. 3, the body shell 28 may also define a pressure side 32 and a suction side 34 extending between leading and trailing ends 36, 38 of the rotor blade 22. Further, the rotor blade 22 may also have a span 40 defining the total length between the blade root 24 and the blade tip 26 and a chord 42 defining the total length between the leading edge 36 and the trialing edge 38. As is generally understood, the chord 42 may generally vary in length with respect to the span 40 as the rotor blade 22 extends from the blade root 24 to the blade tip 26.

In several embodiments, the body shell 28 of the rotor blade 22 may be formed from a plurality of shell components or sections. For example, in one embodiment the body shell 28 may be manufactured from a first shell half or section generally defining the pressure side 32 of the rotor blade 22 and a second shell half or section generally defining the suction side 34 of the rotor blade 22, with such shell sections being secured to one another at the leading and trailing ends 36, 38 of the blade 22. Alternatively, the body shell 28 may be formed from any other suitable number and/or arrangement of shell sections. For instance, in one embodiment, the body shell 28 may be segmented along the longitudinal axis 30 of the rotor blade 22, with each spanwise segment being formed from one or more shell sections.

Additionally, the body shell 28 may generally be formed from any suitable material. For instance, in one embodiment, the body shell 28 may be formed entirely from a laminate composite material, such as a carbon fiber reinforced laminate composite or a glass fiber reinforced laminate composite. Alternatively, one or more portions of the body shell 28 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 22 may also include one or more longitudinally extending structural components configured to provide increased stiffness, buckling resistance and/or strength to the blade 22. For example, the rotor blade 22 may include a pair of longitudinally extending spar caps 44, 46 configured to be engaged against the opposing inner surfaces 48, 50 of the pressure and suction sides 32, 34 of the rotor blade 22, respectively. Additionally, one or more shear webs 52 may be disposed between the spar caps 44, 46 so as to form a beam-like configuration. The spar caps 44, 46 may generally be designed to control the bending stresses and/or other loads acting on the rotor blade 22 in a generally spanwise direction (a direction parallel to the span 40 of the rotor blade 22) during operation of a wind turbine 10. Similarly, the spar caps 44, 46 may also be designed to withstand the spanwise compression occurring during operation of the wind turbine 10.

Referring now to FIG. 4, a close-up, cross-sectional view of one of the spar caps 46 shown in FIG. 3 is illustrated in accordance with aspects of the present subject matter, particularly illustrating the spar cap 46 being constructed or formed from a plurality of pre-cured laminate plates 100. In addition, FIG. 5 illustrates a more detailed, cross-sectional view of a portion of one of the pre-cured laminate plates 100 shown in FIG. 4.

In several embodiments, each pre-cured plate 100 may correspond to a pultruded plate. In such embodiments, one or more fiber materials 102 (e.g., glass or carbon fibers) may be cured during the manufacturing process to form each individual pultruded plate. For example, the fibers 102 may be impregnated with at least one resin material 104 using any suitable means. In particular embodiments, the resin material 104 may include any suitable resin, including but not limited to polyester, polyurethane, polybutylene terephthalate (PBT), polyethylene terephthalate (PET), vinyl ester, epoxy, or similar. The impregnated fibers 102 may then be pulled through a heated stationary die such that the resin 104 cures or undergoes polymerization to form each plate 100. The individually formed plates 100 may then be assembled or joined together (e.g., via a secondary infusion process) to form the resulting spar cap 46. For example, as shown in the illustrated embodiment of FIG. 4, each of the pre-cured laminate plates 100 may form a single layer 106 of the spar cap 46. The layers 106 may then be stacked atop one another and joined together using any suitable means, for example, by vacuum infusing the plates 100 together or by bonding the plates 100 together via an adhesive, a semi-preg material, or a pre-preg material, to form the spar cap 46.

It should be appreciated that, in several embodiments, the plates 100 may be stacked directly one on top of another to form the spar cap 46. Alternatively, a thin mat or fiber layer (e.g., a low weight glass bale) may be positioned between adjacent plates 100. In such an embodiment, the thin fiber layer may be adapted to facilitate improved adhesion and/or resin transfer between the adjacent plates 100.

As particularly shown in FIG. 5, the fibers 102 included within each plate 100 may generally be oriented in a common fiber direction 108. In several embodiments, the fiber direction 108 may extend parallel to the longitudinal or spanwise direction of the rotor blade 22. As such, the fibers 102 contained within each plate 104 used to form the spar cap 46 may generally extending spanwise along the length of the spar cap 46 between the blade root 24 and the blade tip 26.

Additionally, as particularly shown in FIG. 4, in several embodiments, each plate 100 may include a plurality of corrugations or channels 110 formed therein. As indicated above, such channels 110 may assist in conforming the plates 110 to the desired chordwise curvature of the rotor blade 22. Specifically, as shown in FIG. 4, the channels 110 may allow relatively thick plates 100 (e.g., plates having a thickness of 4 to 8 mm) to conform to the curved chordwise shape of the portion of the interior surface 50 of the blade 22 along which they are disposed.

Referring now to FIGS. 6-8, different views of one embodiment of a pre-cured laminate plate 100 having a plurality of channels 110 formed therein is illustrated in accordance with aspects of the present subject matter. Specifically, FIG. 6 illustrates partial, perspective view of the plate 100 and FIG. 7 illustrates a side or end view of the plate 100 shown in FIG. 6. Additionally, FIG. 8 illustrates a bottom view of the plate 100 shown in FIG. 6, particularly illustrating a plurality of openings 112 formed in the plate 100 along the length of each channel 110.

In general, the plate 100 may include a plate body 114 formed by the combination of the fibers 102 and resin 104 described above with reference to FIG. 5. As shown in the illustrated embodiment, the plate body 114 may generally define a rectangular cross-sectional shape extending in a flapwise or thickness direction of the plate 100 (indicated by arrow 116 in FIGS. 6 and 7) between a first side 118 and a second side 120 and in a chordwise or widthwise direction of the plate 100 (indicated by arrow 122 in FIGS. 6-8) between a first end 124 and a second end 126. In addition, the plate body 114 may also be configured to extend lengthwise in a longitudinal direction (indicated by the arrow 128 in FIGS. 6 and 8) of the plate 100 that generally corresponds to both the spanwise direction of the rotor blade 22 and the fiber direction 108 (FIG. 5) of the fibers 102 contained within the plate 100.

Additionally, as indicated above, the plate 100 may include plurality of channels 110. As shown in the illustrated embodiment, the channels 110 may be formed in the plate body 114 between its first and second ends 124, 126 so as to extend lengthwise along the longitudinal direction 128 of the plate 100. As such, each channel 110 may generally extend lengthwise in a direction that is parallel to the fiber direction 108 of the fibers 102.

It should be appreciated that, in general, any suitable number of channels 110 may be defined in the plate body 114, with the channels 110 having any suitable spacing along widthwise direction 122 of the plate 100. For example, in the illustrated embodiment, the plate 100 includes five equally spaced channels 110 defined in the plate body 114. However, in other embodiments, the plate 100 may include less than five channels 110 or more than five channels 110 and/or may have variable spacing along the widthwise direction 122 of the plate 100. For example, the particular number and/or widthwise spacing of the channels 110 may generally be selected so as to allow the shape of the plate 100 to be conformed to the particular blade curvature along which the plate 100 is being assembled.

As particularly shown in FIG. 7, each channel 110 may include a top end 130 (indicated by the dashed line), a bottom end 132 and opposed sidewalls 134 extending between the top and bottom ends 132, 134. In general, the channels 110 may be formed in the plate body 114 such that the top end 130 of each channel 110 is open to one of the sides 118, 120 of the plate body 114 and the bottom end 132 of each channel 110 terminates at a location between the opposed sides 118, 120 of the plate body 114 such that the plate 100 forms a continuous structural member along its width defined between the first and second ends 124, 126 of the plate body 114. For example, in the illustrated embodiment, the channels 110 are formed along the first side 118 of the plate body 114 such that the top end 130 of each channel 110 is generally aligned with the first side 118 of the body 114. Alternatively, the channels 110 may be formed along the second side 120 of the plate body 114 such that the top end 130 of each channel 100 is generally aligned with the second side 120 of the body 114. Moreover, as will be described below with reference to FIGS. 10 and 11, channels 110 may, in other embodiments, be defined along both the first side 118 and the second side 120 of the plate body 114.

Due to the configuration of the channels 110, the plate body 114 may generally define a region of reduced thickness at or adjacent to each channel 110. For example, as shown in FIG. 7, the plate body 114 may define a maximum plate thickness 136 between its first and second sides 118, 120. In addition, the plate body 114 may define a reduced thickness 138 at the location of each channel 110 (e.g., the thickness of the plate body 114 defined between the bottom end 132 of each channel 110 and the second side 120 of the body 114). In several embodiments, the reduced thickness 138 may be equal to less than about 75% of the plate thickness 136, such as a reduced thickness 138 that is equal to less than about 50% of the plate thickness 136 or less than about 25% of the plate thickness 136 or less than about 15% of the plate thickness 136 or less than about 10% of the plate thickness 136 and/or any other subranges therebetween.

The reduced thickness region formed at or adjacent to each channel 110 may generally allow the plate 100 to be conformed to the desired curvature of a rotor blade 22 without requiring the application of excessive force against the plate 100 during the manufacturing process, thereby reducing the strain experienced by the plate 100. Specifically, the channels 110 may allow for a reduction in the stiffness of the plate 100 along its widthwise direction 112, thereby allowing the plate 110 to be flexed or to otherwise take the shape of the chordwise curvature of the rotor blade 22. As such, significantly thicker plates may be used to form a given wind turbine component (e.g., spar cap), which may allow for a reduction in the overall costs associated with manufacturing such component.

It should be appreciated that, when assembling multiple plates 100 to form a given wind turbine component (e.g., a spar cap), the plates 100 may define the same or differing thicknesses 136. For instance, in the embodiment shown in FIG. 4, the plates 100 all define a substantially uniform thickness 136. However, in other embodiments, one or more of the plates 100 may define a maximum plate thickness 136 that differs from the maximum plate thickness 136 of the other assembled plates 100. Similarly, the reduced thickness 138 defined at the location of each channel 110 may be the same or may vary along the same plate 100 and/or across multiple assembled plates 100.

Moreover, it should be appreciated that the channels 110 may generally be configured to define any suitable cross-sectional shape. For example, in the illustrated embodiment, the channels 110 define triangular or pyramidal cross-sectional shapes. However, in other embodiments, the channels 110 may define any other suitable cross-sectional shapes. For instance, FIG. 9 illustrates a partial, perspective view of a plate 100 having channels 110A, 110B formed therein that define differing cross-sectional shapes. Specifically, as shown in FIG. 9, the plate 110 includes channels 110A defining both a rectangular cross-sectional shape and a rounded cross-sectional shape 110B (e.g., a "U-shape").

It should also be appreciated that the channels 110 may generally be formed within the plate body 114 using any suitable process and/or means. In one embodiment, the channels 110 may be formed simultaneously with the forming of the plate body 114. For instance, when the plates 100 correspond to pultruded plates, the die used to manufacture each plate 100 may be designed to include suitable features such that, when the infused fibers 102 are pulled through the die, a plate body 114 is formed that includes channels 110 defined therein. Alternatively, the channels 110 may be formed after the manufacturing of the plate body 110. For instance, the channels 110 may be machined into the pre-formed plate body 110 using any suitable machining process.

Additionally, as indicated above, the plate body 114 may also include a plurality of perforations or openings 112 spaced apart along the length of each channel 110, with each opening 112 extending between its corresponding channel 110 and the opposed side of the plate body 114. For instance, as shown in FIG. 8, a plurality of openings 112 may be defined through the second side 120 of the plate body 114 that extend from the second side 120 to the bottom end 132 of each channel 110. Such openings 112 may be configured to provide the plate 100 with additional widthwise flexibility, thereby allowing improved conformance with the chordwise curvature of a rotor blade 22. In addition, the openings 112 may also promote improved resin transfer during a subsequent infusion process. For instance, resin directed along the second side 120 of the plate body 114 may flow through the openings 112 and into the channels 110 to allow the resin to be distributed lengthwise along each channel 110 and/or along the first side 118 of the plate body 114.

Moreover, as shown in FIGS. 6 and 7, when the plate 100 is not flexed or is otherwise providing in a planar orientation, each channel 110 may generally have an open configuration, with its sidewalls 134 being spaced apart from one another in the widthwise direction 122 of the plate 100. However, when the plate 100 is flexed to conform to the curvature of a rotor blade 22, the sidewalls 134 may be moved inwardly relative to one another such that the widthwise gap defined between the sidewalls 134 is reduced and/or substantially eliminated (e.g., as shown in FIG. 4). Moreover, when a subsequent infusion process is performed on the assembled plates 100, any remaining space defined between the sidewalls 134 may be filled with resin.

Additionally, it should be appreciated that, when the disclosed plates 100 are assembled or stacked to form a given wind turbine component (e.g., a spar cap), the channels 110 may be formed in each plate 100 at the same or at differing locations relative to the channels 110 of the other plates 100. For instance, as shown in the embodiment of FIG. 4, the channels 110 are formed in the plates 100 at the same or similar locations such that the channels 110 of adjacent plates 110 are generally aligned with one another along the chordwise direction of the rotor blade 22 (or widthwise direction 122 of the plates 100). Alternatively, the channels 110 may be formed in the plates 100 such that the channels 110 of adjacent plates 110 are offset from one another along the chordwise direction of the rotor blade 22 (or widthwise direction 122 of the plates 100). Such alignment or misalignment of the channels 110 may impact the resin flow through the assembly during a subsequent infusion process, particularly when the plates 100 include the openings 112 described above. For instance, by aligning the channels 110, a quicker resin transfer may be achieved across the thickness direction 116 of the assembly. Similarly, by offsetting the channels 110, the resin transfer across the thickness direction 116 of the assembly may be slowed, which may be desirable in some applications.

It should also be appreciated that, although the plates 100 were generally described herein as including channels 110 formed along one side of the plate body 114, each plate 100 may, instead, include one or more channels 110 formed on both sides of the plate body 114. For instance, FIG. 10 illustrates an alternative embodiment of the plate 100 shown in FIGS. 6-8. As shown, in addition to including a first plurality of channels 110 defined along the first side 118 of the plate body 114, the plate 100 includes a second plurality of channels 111 defined along the second side 120 of the plate body 114. In such an embodiment, the channels 110, 111 may be staggered or spaced apart along the widthwise direction 122 of the plate body 114 such that plate 100 includes alternating channels 110, 110 along the first and second sides 118, 120 of the body 114.

Alternatively, the channels 110, 111 may be formed along the first and second sides 118, 120 of the plate body 114 so as to be aligned with one another along the widthwise direction 122 of the plate body 114. For instance, FIG. 11 illustrates an alternative embodiment of the plate 100 shown in FIG. 10 having the aligned channels 110, 111 formed along the opposed sides 118, 120 of the plate body 114. As shown in FIG. 11, in such an embodiment, the plate may include regions of reduced thickness 138 defined directly between the aligned channels 110, 111.

As indicated above, it should be appreciated that, although the present subject matter has generally been described herein with reference to the use of the disclosed plates 100 in forming a spar cap of a rotor blade, the plates 100 may be utilized to form any other suitable structural component of a wind turbine 10. For instance, in one embodiment, the plates 100 may be used to form any other structural component that is desired to conform to the curvature of the rotor blade and/or that otherwise is desired to have a curved profile, such as an auxiliary spar cap or any other structural member that is placed adjacent to the body shell 28 of the rotor blade 22 (e.g., a structural patch that only extends along a portion of the span 40 of the rotor blade 22).

It should also be appreciated that, as indicated above, the plates 100 may also be utilized to form any other suitable section, component and/or feature of a wind turbine rotor blade. For instance, in one embodiment, the flexibility provided by the disclosed plates 100 may allow the plates to conform to the curved shape of the blade root 24 of a rotor blade 22. In such an embodiment, the plates 100 may be utilized, for example, to build-up the thickness of the blade root 24 and/or to completely form the entire blade root 24.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A component for a wind turbine rotor blade, the component comprising:
   an assembly of pre-cured laminate plates, each pre-cured laminate plate comprising:
   a plate body formed from a combination of fibers and resin, the plate body extending in a thickness direction between a first side and a second side and in a widthwise direction between a first end and a second end, the plate body defining a maximum plate thickness in the thickness direction between the first and second sides; and a plurality of channels formed in the plate body between the first and second ends, each of the plurality of channels extending in the thickness direction between a top end that is open along the first side of the plate body and a bottom end that terminates at a location between the first and second sides of the plate body such that the plate body defines a reduced thickness between the second side of the plate body and the bottom end of each of the plurality of channels, wherein a plurality of openings are defined between the bottom end of each of the plurality of channels and the second side of the plate body, each opening of the plurality of openings defining a closed perimeter shape.

2. The component of claim 1, wherein the reduced thickness is equal to less than about 50% of the maximum plate thickness of the plate body.

3. The component of claim 1, wherein the fibers are oriented in the plate body along a fiber direction, the plurality of channels extending lengthwise along the plate body in a direction that is parallel to the fiber direction.

4. The component of claim 1, wherein each of the plurality of channels defines one of a triangular cross-sectional shape, a rectangular cross-sectional shape or a rounded cross-sectional shape.

5. The component of claim 1, wherein the plurality of openings are spaced apart from one another along a length of each of the plurality of channels.

6. The component of claim 1, wherein the plurality of channels corresponds to a first plurality of channels, further comprising a second plurality of channels formed in the plate body between the first and second ends, each of the second plurality of channels extending in the thickness direction between a top end that is open along the second side of the plate body and a bottom end that terminates at a location between the first and second sides.

7. The component of claim 6, wherein the first and second plurality of channels are aligned with one another or spaced apart from one another in the widthwise direction of the plate body.

8. The rotor blade of claim 1, wherein the first and second plurality of channels are aligned with one another or spaced apart from one another in the widthwise direction of the plate body.

9. A spar cap for a wind turbine rotor blade, the spar cap comprising:
an assembly of pre-cured laminate plates, each pre-cured laminate plate comprising:
a plate body formed from a combination of fibers and resin, the plate body extending in a thickness direction between a first side and a second side and in a widthwise direction between a first end and a second end, the plate body defining a maximum plate thickness in the thickness direction between the first and second sides; and
a plurality of channels formed in the plate body between the first and second ends, each of the plurality of channels extending in the thickness direction between a top end that is open along the first side of the plate body and a bottom end that terminates at a location between the first and second sides of the plate body such that the plate body defines a reduced thickness between the second side of the plate body and the bottom end of each of the plurality of channels, wherein three or more openings are defined between the bottom end of each of the plurality of channels and the second side of the plate body, the three or more openings being spaced apart from one another along a length of each of the plurality of channels.

10. The spar cap of claim 9, wherein the reduced thickness is equal to less than about 50% of the maximum plate thickness of the plate body.

11. The spar cap of claim 9, wherein the fibers are oriented in the plate body along a fiber direction, the plurality of channels extending lengthwise along the plate body in a direction that is parallel to the fiber direction.

12. The spar cap of claim 9, wherein each of the three or more openings defines a closed perimeter shape.

13. The spar cap of claim 9, wherein the plurality of channels corresponds to a first plurality of channels, further comprising a second plurality of channels formed in the plate body between the first and second ends, each of the second plurality of channels extending in the thickness direction between a top end that is open along the second side of the plate body and a bottom end that terminates at a location between the first and second sides, the first and second plurality of channels being aligned with one another or being spaced apart from one another in the widthwise direction of the plate body.

14. A rotor blade for a wind turbine, the rotor blade comprising:
a blade root;
a blade tip;
a body shell extending between the blade root and the blade tip; and
a structural component positioned within the body shell, the structural component formed from an assembly of pre-cured laminate plates, each pre-cured laminate plate comprising:
a plate body formed from a combination of fibers and resin, the plate body extending in a thickness direction between a first side and a second side and in a widthwise direction between a first end and a second end, the plate body defining a plate thickness in the thickness direction between the first and second sides; and
a plurality of channels formed in the plate body between the first and second ends, each of the plurality of channels extending in the thickness direction between a top end that is open along the first side of the plate body and a bottom end that terminates at a location between the first and second sides of the plate body such that the plate body defines a reduced thickness between the second side of the plate body and the bottom end of each of the plurality of channels,
wherein three or more openings are defined between the bottom end of each of the plurality of channels and the second side of the plate body, the three or more openings being spaced apart from one another along a length of each of the plurality of channels.

15. The rotor blade of claim 14, wherein each pre-cured laminate plate conforms to a curvature of the body shell.

16. The rotor blade of claim 14, wherein the plate thickness corresponds to a maximum thickness of the plate body defined between the first and second sides, wherein the reduced thickness is equal to less than about 50% of the plate thickness of the plate body.

17. The rotor blade of claim 14, wherein the fibers are oriented in the plate body along a fiber direction, the plurality of channels extending lengthwise along the plate body in a direction that is parallel to the fiber direction.

18. The rotor blade of claim 14, wherein each of the plurality of channels defines one of a triangular cross-sectional shape, a rectangular cross-sectional shape or a rounded cross-sectional shape.

19. The rotor blade of claim 14, wherein three or more openings are defined between the bottom end of each of the plurality of channels and the second side of the plate body.

20. The rotor blade of claim 14, wherein the plurality of channels corresponds to a first plurality of channels, further comprising a second plurality of channels formed in the plate body between the first and second ends, each of the second plurality of channels extending in the thickness direction between a top end that is open along the second side of the plate body and a bottom end that terminates at a location between the first and second sides.

* * * * *